Patented Sept. 10, 1929.

1,727,738

UNITED STATES PATENT OFFICE.

GERHARD ELIAS VAN NES, OF PASOEROEAN, JAVA, DUTCH EAST INDIES.

PURIFICATION OF LIQUIDS CONTAINING SUGAR.

No Drawing. Application filed April 30, 1927, Serial No. 188,060, and in the Netherlands September 13, 1926.

This invention relates to the purification of sugar-juices obtained from sugar-cane, by means of a base, preferably lime, and carbon-dioxide or other acid gas and has for its object to attain a purification which equals in effect that which can be attained by the carbonation methods at present in use, without requiring so much lime as is inherent in the known methods.

According to the invention, a quantity of lime or other base is first added to the cold raw juice, such that the reaction towards phenolphthalein is rendered weakly alkaline. The solution is then over-saturated with carbon-dioxide or with other acid gas; that is to say, carbon-dioxide, or gases containing carbon-dioxide or other acid gases, are passed through the solution until the latter shows an acid reaction at least towards phenolphthalein. The solution is then heated to a temperature not exceeding 60° C., preferably a temperature of 55° C., and a quantity of lime is added such that the solution shows a final alkalinity higher than that corresponding to 300 milligrams of CaO per litre in the juice, preferably an alkalinity corresponding to about 700 milligrams of CaO per litre when titrated, using phenolphthalein as indicator. This usually requires about 10–12 litres of milk of lime of 15° Baumé per 1000 litres of juice. The precipitate is allowed to settle for about half an hour. It has been found that when the above mentioned alkalinity and temperature prevail during the settling period, no decomposition of reducing sugars occurs, which might be disadvantageous for the further operations. After the precipitate has settled, the turbid juice, having a volume of about 30–35% of the total volume of the juice, is separated from the clear juice by decantation.

The clear juice can be filtered easily after it has been fully carbonated, and may then be worked up in the usual manner.

The turbid juice, together with the deposited matter, may be filtered and the filtrate may be added to the clear juice. As the volume of the turbid juice is relatively very large, however, the filtering operation of this juice requires an inconveniently large filtering apparatus. The turbid juice is therefore saturated with carbon-dioxide or other acid gas until it is again over-saturated (i. e. acid towards phenolphthalein) and is then heated to a temperature above 50° C., preferably to a temperature of 80° C., and the precipitate is allowed to settle.

The deposits settle very rapidly. The turbid juice obtained (about 20%) can be filtered very easily. The juice from the filter-press is added to the clear juice from the final settling and the liquid obtained in this way is added to a subsequent batch of cold over-saturated raw juice, before the operation of heating the latter to 55° C., as previously described.

It has been found that the addition of juice, which has been subjected to a preliminary treatment as described, to the over-saturated raw juice has a favourable influence on the content of lime of the purified juice finally obtained.

What I claim is:—

1. A process of purifying sugar-juices, comprising the steps of treating the raw juice with lime until it shows a weakly-alkaline reaction, then saturating it with an acid gas until it shows an acid reaction, heating the liquid so treated to a temperature not exceeding 60° C., adding a further quantity of lime until the liquid shows a final alkalinity higher than that corresponding to 300 mg. CaO per liter in the juice, and decanting the clear juice from the turbid juice.

2. A process of purifying sugar-juices, comprising the steps of treating the raw juice with lime until it shows a weakly-alkaline reaction, then saturating it with carbonic acid gas until it shows an acid reaction, heating the liquid so treated to a temperature not exceeding 60° C., adding a further quantity of lime until the liquid shows a final alkalinity of about 700 mg. CaO per liter in the juice, decanting the clear juice from the turbid juice, saturating the clear juice with carbonic acid gas, and filtering.

3. A process according to claim 2, in which the turbid juice is treated with carbonic acid gas until its shows an acid reaction, then heated to a temperature of about 80° C., the precipitate then allowed to settle, and then decanted and filtered, whereupon the filtered liquid is added, with the clear juice, to a further batch of raw juice.

4. A process of purifying sugar-juices, comprising the steps of heating the juice to a temperature not exceeding 60° C., treating it with lime to obtain an alkalinity higher than that corresponding to 300 mg. CaO per liter in the juice, allowing the liquid so treated to settle, decanting the clear juice from the turbid juice, treating the turbid juice with an acid gas until it shows an acid reaction, then heating it to a temperature between 50° C., and the boiling point at atmospheric pressure, allowing the precipitate to settle, then decanting and filtering the turbid juice and then adding the filtered liquid, with the clear juice from the last decantation, to a further batch of raw juice.

In testimony whereof I affix my signature.

GERHARD ELIAS VAN NES.